United States Patent [19]

Son et al.

[11] Patent Number: 5,629,803
[45] Date of Patent: May 13, 1997

[54] SYSTEM FOR A DIRECT IMAGE TRANSMISSION BY SPECTRAL CODING

[75] Inventors: Jung Y. Son; Hyung W. Jeon; Yong J. Choi, all of Seoul, Rep. of Korea

[73] Assignee: Korea Institute of Science and Technology, Seoul, Rep. of Korea

[21] Appl. No.: 309,655

[22] Filed: Sep. 21, 1994

[30] Foreign Application Priority Data

May 7, 1994 [KR] Rep. of Korea ............... 94-10028

[51] Int. Cl.$^6$ ................................................. G02B 5/18
[52] U.S. Cl. .................... 359/575; 359/566; 359/615; 385/37; 385/116
[58] Field of Search ............... 385/116, 37, 133; 359/566, 567, 569, 575, 615

[56] References Cited

U.S. PATENT DOCUMENTS

| | | | |
|---|---|---|---|
| 3,191,487 | 6/1965 | Kruythoff et al. | 359/615 |
| 3,192,825 | 7/1965 | Courtney-Pratt et al. | 359/615 |
| 3,457,416 | 7/1969 | Elliot | 359/615 |
| 3,471,214 | 10/1969 | Polanyi | 385/119 |
| 3,758,188 | 9/1973 | Koester | 385/116 |
| 4,735,473 | 4/1988 | Migozzi et al. | 385/116 |
| 5,315,423 | 5/1994 | Hong | 359/22 |

FOREIGN PATENT DOCUMENTS

| | | | |
|---|---|---|---|
| 0031027 | 7/1981 | European Pat. Off. | 385/37 |
| 0186166 | 7/1986 | European Pat. Off. | 359/566 |
| 0149921 | 7/1986 | Japan | 359/566 |

OTHER PUBLICATIONS

A. LaCourt, et al. "Transsmission D'Images et D'Hologrammes Par Une Nappe de Fibres Optiques au Moyen d'un Codage Chromatique", *Optics Communications*, vol. 27, No. 1, Oct. 1978, pp. 57–60.

A. Yariv, "On Transmission and Recovery of Three–Dimensional Image Information In Optical Waveguides" J. Opt. Soc. Am., vol. 66, No. 4, Apr. 1966, pp. 301–305.

A. Yariv, "Three Dimensional Pictorial Transmission in Optical Fibers", Appl. Phys. Lett., vol. 28, No. 2, Jan. 1976, pp. 88–89.

A. Gover et al., "Direct Transmission of Pictorial Information in Multimode Optical Fibers", J. Opt. Soc. Am., vol. 66, No. 4, Apr. 1976, pp. 306–311.

A. Friesem, et al., "Parallel Image Transmission by a Single Optical Fiber", Optics Letters, vol. 2, No. 5, May 1978, pp. 133–135.

B. Adams, et al., "Electrooptical Imaging System Using Wavelength Coding", Applied Optics, vol. 22, No. 13, Jul. 1983, pp. 2026–2028.

N. Bianki, et al, "Increasing the Field of View and Resolution in Fiber–Optic Viewing Systems", Sov. J. Opt. Technol., vol. 47, No. 8, Aug. 1980 477–479.

G. Liang, et al., "Imaging Transmission through a Single Optical Fiber by Colour Coding", Electronics Letters, vol. 18, No. 15, Jul. 1982, pp. 660–661.

(List continued on next page.)

*Primary Examiner*—Paul M. Dzierzynski
*Assistant Examiner*—John Juba, Jr.
*Attorney, Agent, or Firm*—Oblon, Spivak, McClelland, Maier & Neustadt, P.C.

[57] ABSTRACT

The present invention relates to a method and a device for transmitting images via a transmitting medium, for example, optical fibers, without digitizing images (hereafter called "direct image transmission") and, more particularly, a method and a device for direct image transmission by spectral coding. It is an object of the present invention to provide a method and a device for all optical types of direct image transmission that permits two-dimensional images to be directly transmitted without electrical driving units for scanning or tuning images by distributing light from a point source spectrally so that each pixel in the resulting two-dimensional image corresponds one-to-one with the light having a specific wavelength.

2 Claims, 5 Drawing Sheets

OTHER PUBLICATIONS

D.E. Hulsey and S.K. Case, "Fiber–Optic Transmission System with High Resolution," Applied Optics, vol. 22, No. 13, 1 Jul. 1983, pp. 2029–2033.

Anthony M. Tai, "Two–dimensional Image Transmission Through a Single Optical Fiber by Wavelength–time Multiplexing," Applied Optics, vol. 22, No. 23, 1 Dec. 1983, pp. 3826–3832.

Eung Gi Paek, C.E. Zab, K.W. Cheung and L. Curtis, "All–optical Image Transmission Through a Single–mode Fiber," Optics Letters, vol. 17, No. 8, Apr. 15, 1992, pp. 613–615.

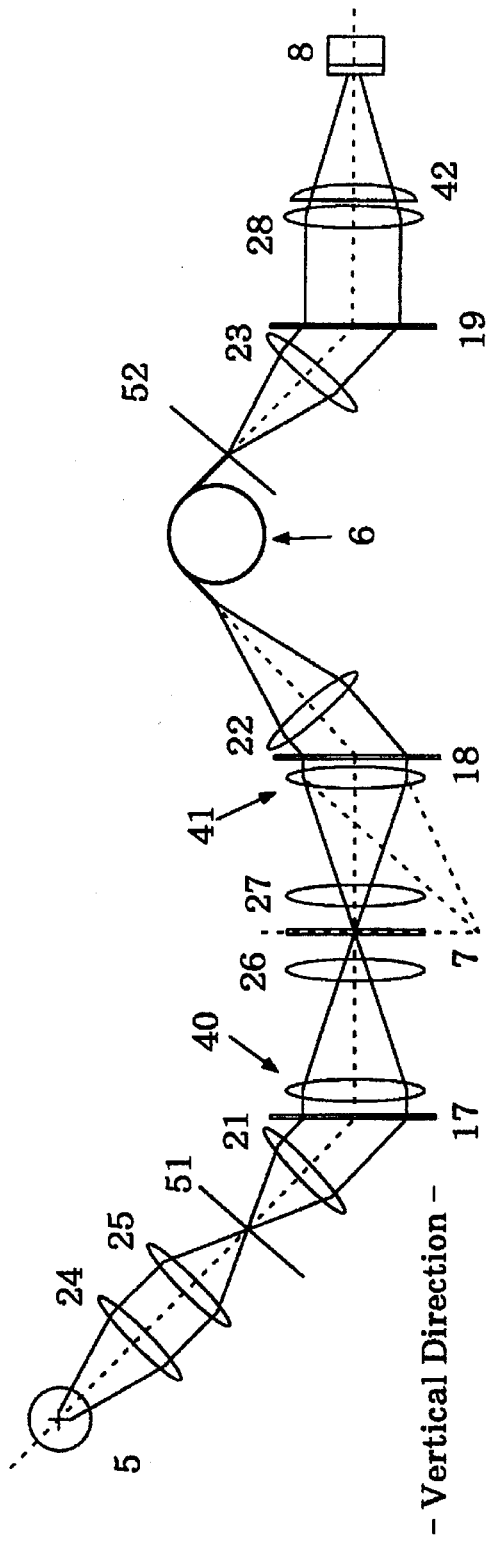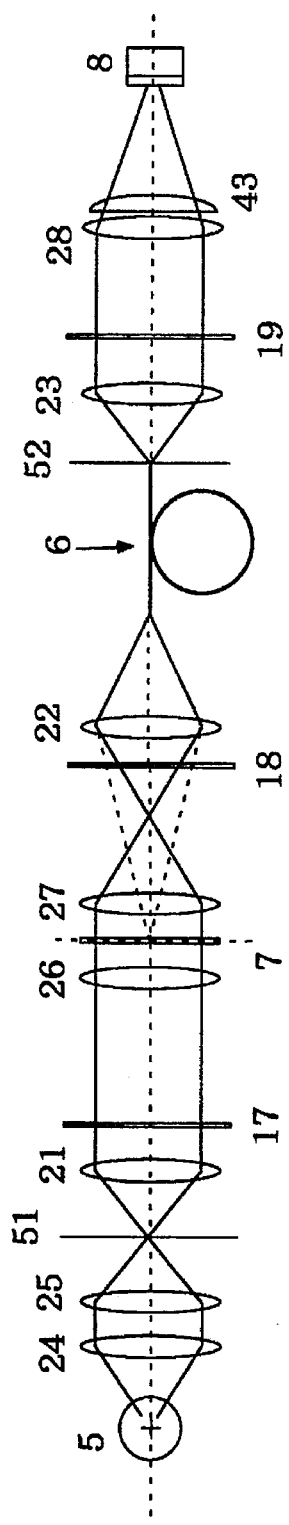
FIG. 3A
FIG. 3B

SYSTEM FOR A DIRECT IMAGE TRANSMISSION BY SPECTRAL CODING

BACKGROUND OF THE INVENTION

1. Field of the Invention

The present invention generally relates to a system for transmitting images through transmitting media, for example, optical fibers, without digitizing images (hereafter called "direct image transmission") and, more particularly, to a system for direct image transmission by spectral coding.

The spectral coding method includes changing a portion of the spectrum of light into two-dimensional form according to the size of an image using the parallel processing property of the wavelength of the light wave, so that each pixel in the two-dimensional image corresponds one-to-one with light having a specific wavelength.

2. Description of the Related Art

Conventional transmission of information through optical fibers has been accomplished by following steps: at the transmitter, digital signals acquired by digitizing one-dimensional or two-dimensional information are converted into the corresponding light pulse train by optical encoding, input to optical fibers and transmitted; at the receiver, the transmitted light pulses are converted into desired types of signals using optical and electronic devices. However, such conventional continuous transmission of information using pulses cannot be applied to the high speed transmission of the information of large capacity such as HDTV (high definition television) images or three-dimensional images.

New transmission methods have been suggested for direct transmission of light which forming images through a transmission medium, for example, optical fibers, to overcome the above problem. According to such direct image transmission methods, transmission time can be reduced and the transmission system can be simplified since there is no need for conversion of electrical signals to optical signals and for coding at the transmitter, and no need for conversion of the received optical signals to electrical signals and for coding at the receiver. Furthermore, this direct image transmission method permits high speed transmission of larger volumes information compared to the conventional transmission methods because it transmits optical information in parallel using the parallel characteristics of light. Thus, direct image transmission technology will be very important for next generation communication technologies.

Image transmission methods using spectral coding include a method of varying the wavelengths of dye lasers by tuning them to the positions of pixels [see Applied Optics Vol. 22, No. 13, 1983, pp. 2029-2033], a method of matching light from a xenon arc lamp to a linear portion of an image by grating scanning [see Applied Optics Vol. 22, No. 23, 1983, pp. 3826-3832], and a method of symmetrizing a spectrum which is spread into one direction by fixed gratings, to a linear portion on an image by lens. However, such methods need electrical drive equipment in order to transmit an entire picture since it is necessary to scan in one or two directions in order to transmit two-dimensional images, or tune image or grating simultaneously. Thus such methods have a problem that the transmission velocity thereof is rather lower than digitized transmission method.

Recently, instead of using scanning devices, a method of using an array comprising a plurality of laser diodes (LD) having a specific wavelength in two dimensions and assigning the wavelength of each LD to each pixel has been suggested. [see Optics Letters Vol. 17, No. 8, 1992, pp. 613-615]. This method, however, is basically inappropriate to image transmission requiring high resolution since there are many problems in producing LDs having wavelength differences for the required high resolution and adjusting the spacing of the LD array.

SUMMARY OF THE INVENTION

It is an object of the present invention to provide a system for all optical type direct image transmission that permits two-dimensional images to be directly transmitted without electric drive systems for scanning or tuning images. The object of the present invention is accomplished by disposing one diffraction grating and a plurality of diffraction gratings, wherein a plurality of diffraction gratings with different grating spacings are disposed parallel and adjacent to one another in a stripe format on a single plane, so that the directions of said one grating and said plurality of diffraction gratings are perpendicular to each other. A spectrum of light from a point source is distributed spectrally and each pixel in a two-dimensional image corresponds to a particular wavelength of light in one-to-one manner.

BRIEF DESCRIPTION OF THE DRAWINGS

The foregoing and other objects, features and advantages of the present invention will become apparent to one skilled in the art upon reading the following detailed description of the preferred embodiments of the invention and referring to the accompanying drawings in which:

FIGS. 3A and 3B are schematic diagrams of a system for direct image transmission according to a preferred embodiment of the present invention.

DETAILED DESCRIPTION OF THE PREFERRED EMBODIMENTS

Figure 1A:
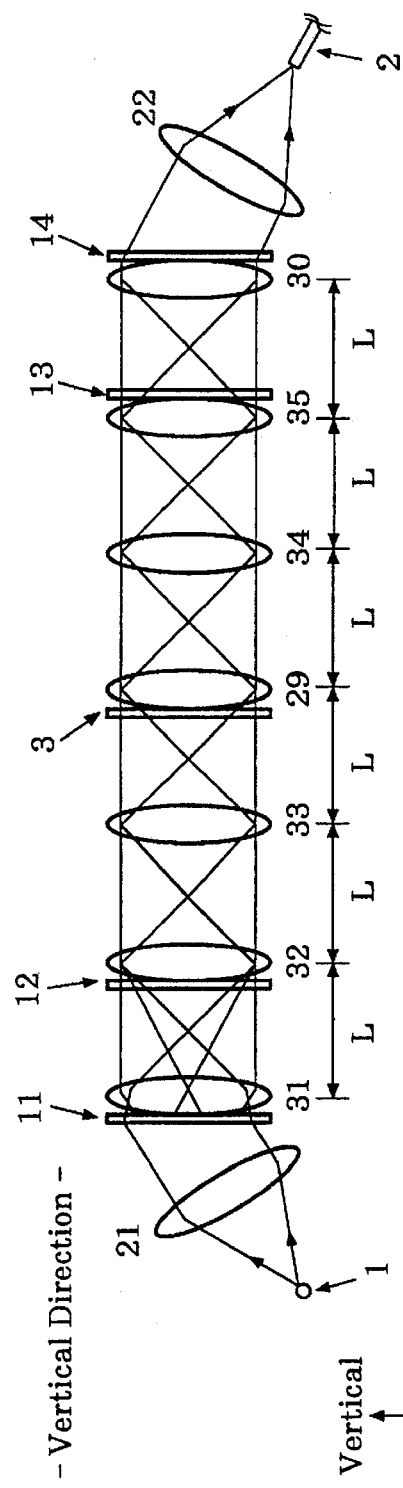
FIGS. 1A and 1B are schematic diagrams of a transmitter in a system for direct image transmission according to the present invention.

Unless otherwise noted herein, like components have like reference numerals throughout the drawings.

Figure 1B:
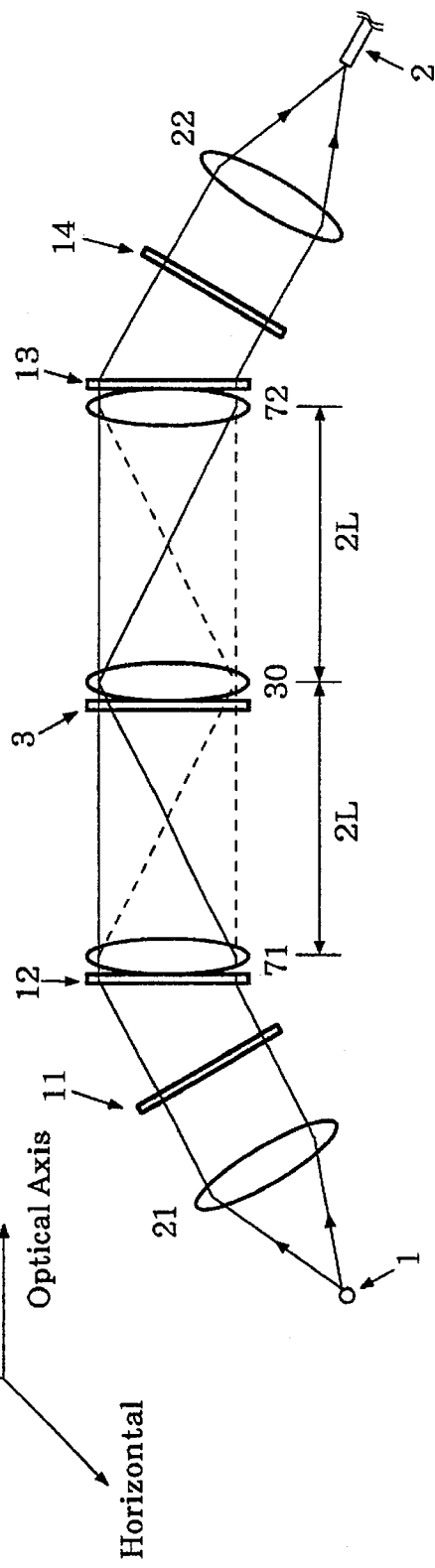

FIGS. 1A and 1B illustrate a structural concept of a transmitter in a system for direct image transmission according to the present invention.

White light from a point source 1 is collimated by a lens 21, and the collimated light is inputted into a grating 11. To the vertical direction shown in FIG. 1A, the incident angle of the collimated light onto the grating 11 is predetermined so that a diffracted beam of the first order of the above-described collimated light from the grating 11 is focused by a cylindrical lens 31 disposed parallel and adjacent to the grating 11. The direction of the grating 11 may be either horizontal or vertical with respect to the optical axis, and thus the diffracted beam is continuously and discretely distributed horizontal or vertical with respect to the optical axis according to the direction of the grating. The distribution of the diffracted beam is such that the spectrum components of the point source 1 are disposed from the light having short wavelength, i.e., nearer to the optical axis, to the light having long wavelength. For the sake of convenience, described hereafter is the embodiment wherein the grating 11 is disposed vertical to the optical axis. Thus, the collimated light by the spherical lens 21 is diffracted by the grating 11, to have a continuous diffraction distribution perpendicular to the direction of grating 11.

A cylindrical lens 31 disposed parallel and adjacent to the grating 11 selects the light beams with wavelengths in the range required for transmission, for example, $\lambda_1$ to $\lambda_2$, and focuses in the grating frame of a plurality of diffraction gratings 12 whose directions are perpendicular to the direction of the grating 11. According to a preferred embodiment of the present invention, each diffraction grating which composes the plurality of diffraction gratings 12 is disposed parallel and adjacent one another in a stripe format extending in the same direction as that of the spectrum spread by the grating 11. The direction of each grating which composes a plurality of diffraction gratings 12 is same as the direction of the spectrum spread by the grating 11, but the spacing between each grating may be different. The spacings between each grating in the plurality of diffraction gratings 12 may be disposed increasingly or decreasingly according to the given rule. The spectra spread by the plurality of diffraction gratings 12 as described above are distributed perpendicular to the direction of spectrum spread by the grating 11 wherein the wavelengths range from $\lambda_1$ to $\lambda_2$ for each diffraction grating which composes the plurality of diffraction gratings 12. That is, the directions of the spectra spread by the plurality of diffraction gratings 12 are perpendicular to the directions of the component diffraction gratings. The total number of diffraction gratings in the plurality of diffraction gratings 12 represents the resolution of the plurality of diffraction gratings 12 in the horizontal direction, thus the resolution is inversely proportional to the height of stripe of each grating which constitutes a plurality of diffraction gratings. For the given wavelength range of $\lambda_1$ to $\lambda_2$, the interval of the wavelength corresponding to each pixel is given as approximately $(\lambda_1-\lambda_2)/N^2$ where $N^2$ is total number of pixels, and the interval of each stripe of diffraction gratings is given as approximately $(\lambda_1-\lambda_2)/N$ when $N \gg 1$.

In the plurality of diffraction gratings 12 according to the present invention, each stripe of the component diffraction grating has a predetermined height, and the spacing between diffraction grating in each stripe is determined so that the light having the range of wavelength corresponding to the height of each stripe is diffracted to the same direction when it is a diffracted beam of the first order. The diffracted beam focused by the cylindrical lens 31 propagates to a cylindrical lens 32 and an input device 3, and is focused on a spherical lens 29 which becomes an image plane. A cylindrical lens 33 is disposed so that an image from diffraction gratings 12 is focused on a spherical lens 29 which becomes an image plane. The spectrum on the spherical lens 29 is distributed continuously so that the wavelengths increase from left to right and from top to bottom, referring to the arrangement of the plurality of diffraction gratings 12 in the vertical direction. The input device 3 providing an input image includes a spatial light modulator which is an image display with transparency, a slide film, and so on.

To the horizontal direction shown in FIG. 1B, collimated beams through a lens 21 is inputted to the plurality of diffraction gratings 12 through a grating 11. The incident angle is determined so that a diffracted beam of the first order by the plurality of diffraction gratings 12 is focused on a spherical lens 30, which is an image plane, by a spherical lens 71 adjacent to the plurality of diffraction gratings 12. Spherical lenses 29 and 30 on the image planes respectively focus the light through the image plane.

An optical system for coupling light through spherical lens 29 or 30 to an optical fiber 2 is disposed symmetrical to the above described optical system between the spherical lens 21 focusing light from a point source 1 and the above described spherical lens 29 or 30. An optical system from the spherical lens 29 or 30 to a spherical lens 22 is for converting the spectral coded images to collimated beams, and the spherical lens 22 focuses the collimated beam on the entrance of an optical fiber 2. The spherical lens 22 has a focal length such that the collimated beams are coupled to the optical fiber 2 to the maximum degree.

Figure 2A:
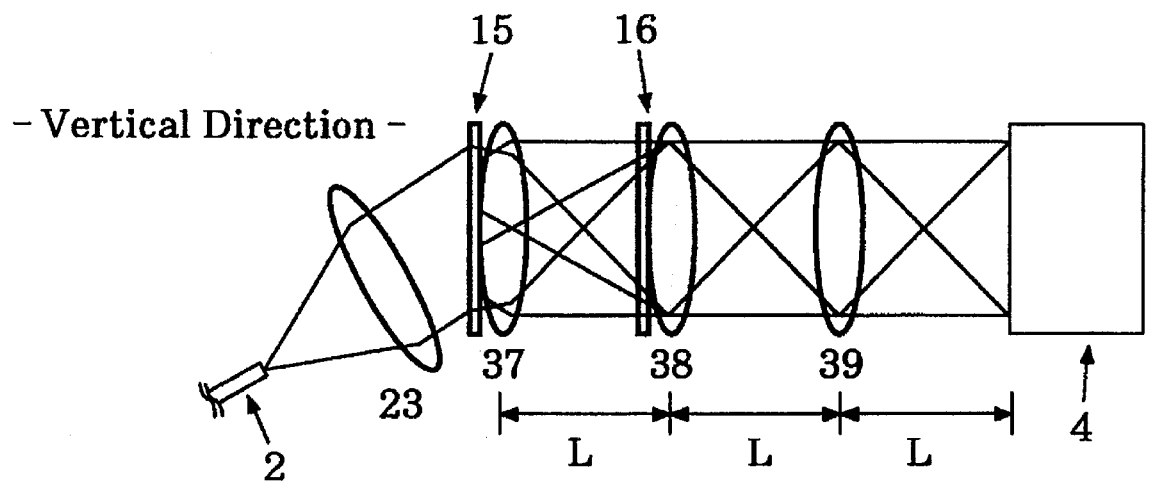
FIGS. 2A and 2B are schematic diagrams of a receiver in a system for direct image transmission according to the present invention.
Figure 2B:
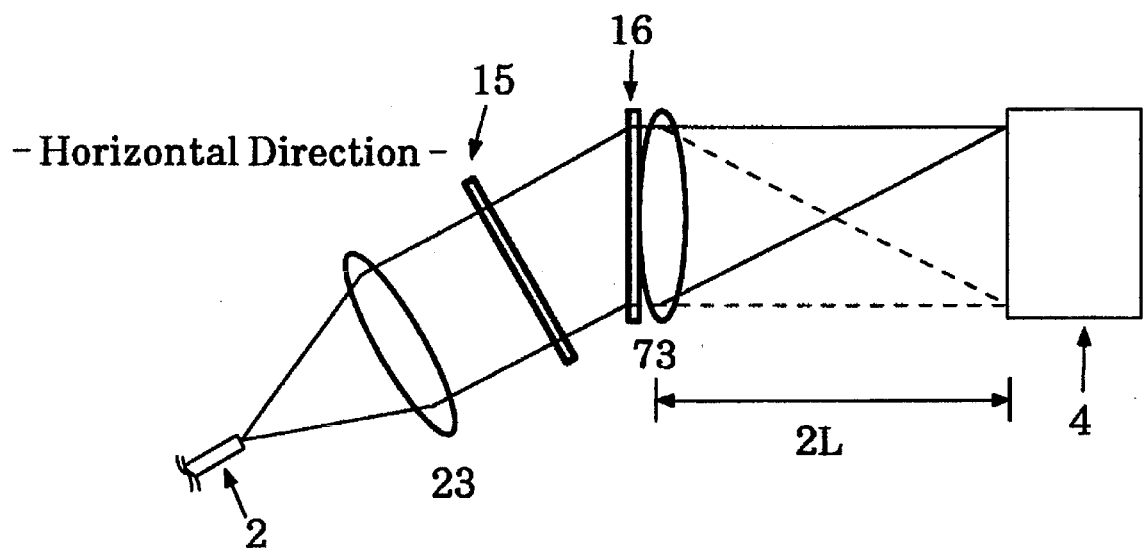

FIGS. 2A and 2B illustrate a structural concept of a receiver in a system for direct image transmission according to the present invention. An arrangement of an optical system which is similar to the arrangement of the optical system from the front portion of the transmitter, that is, point source 1, to an input device 3 which is an image plane, should be also provided at a receiver so as to reproduce the original image from the output of the optical fiber 2A and 2B by splitting wavelengths, as shown in FIG. 2. In the preferred embodiment of the present invention, only shown is the case where the arrangement of gratings and lenses at the transmitter is identical to that at the receiver.

Referring now to FIGS. 1A-1B and 2A-2B, the type, size, and arrangement of the lenses at the transmitter are the same as the type, size, and arrangement of the corresponding lenses at the receiver if the gratings 11 and 15 are identical to the gratings 12 and 16, respectively. Thus, since the original image is focused on the image plane at the receiver corresponding to the image plane at the transmitter, the original image can be reproduced by disposing an image receiving means 4, which is an image recognition device, at the position corresponding to the image plane at the receiver. The image receiving means 4 may include a known CCD (charge coupled device) camera or a fluorescent screen.

FIGS. 3A and 3B show a direct image transmission system for transmitting an image directly through a transmitting medium as a preferred embodiment according to the present invention. Preferably, a xenon light with an output of 150 watts and a discharge area of 0.5 mm×2.2 mm is used as a light source 5. Light discharged at the light source 5 is collimated by a spherical lens 24, and this collimated light is focused by a spherical lens 25. The focused light propagates through a small pinhole 51 whose size is 200μm× 60μm, and forms a point source as shown in FIGS. 1A and 1B. Since the size of the point source affects the quantity of light which is inputted to the optical fiber by the optical system at the transmitter, it is preferable that the size is as small as the size of the core portion of the optical fiber. Light passed through the pinhole 51 is collimated by a spherical lens 21 and irradiates the plurality of diffraction gratings 17 to form a two-dimensional spectrum distribution.

Figure 4:
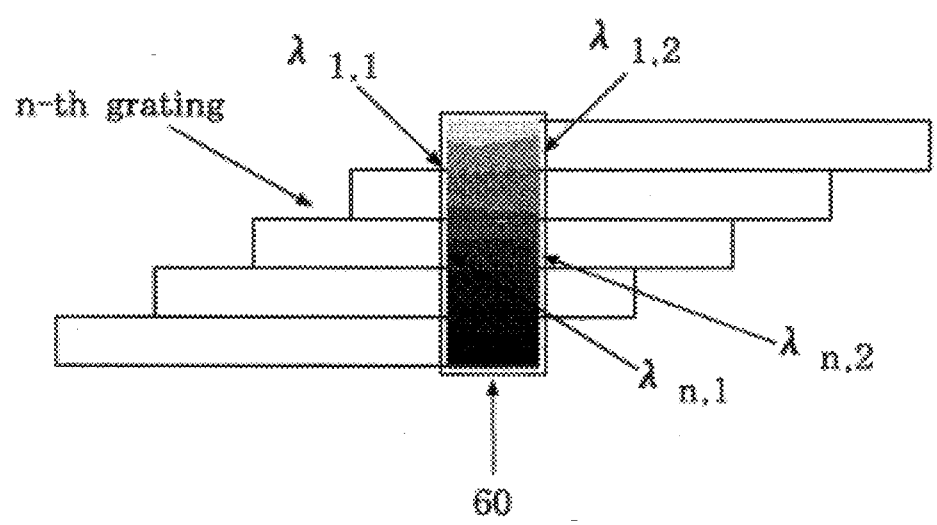
FIG. 4 is a conceptual diagram of a two-dimensional spectral grating element used in a device for direct image transmission according to a preferred embodiment of the present invention.

The spectrum distribution produced by the plurality of diffraction gratings 17 according to the preferred embodiment of the present invention is shown in FIG. 4 in detail. When the light emitted from a light source 5 is split into the wavelength range of $\lambda_1$ to $\lambda_2$ which is required for transmission, wherein the wavelength range is divided into N arrays of diffraction gratings as holography elements by a plurality of diffraction gratings 17 as shown in FIG. 4. In the preferred embodiment of the present invention, a spectrum having wavelengths of 400 nm to 700 nm is provided by the plurality of diffraction gratings arrayed in 5 or 10 rows. Light split by the plurality of diffraction gratings 17 is focused by a cylindrical lens 40 and a spherical lens 26. The plurality of diffraction gratings 17, a cylindrical lens 40 and a spherical lens 26 are appropriately disposed so that only the range 60 of wavelengths required for optical transmission is focused on an input device 7, as shown in FIG. 4. Preferably, a slide film is used as an input device 7, and the size of an input image is 1.2 cm×0.35 cm. According to the preferred embodiment of the present invention, an optical system 27, 41, 18 and 22, in which the light including the information of an input image propagates to the optical fiber 6, is disposed symmetrical to the optical system 21, 17, 40 and 26 which forms an input image from a pinhole 51, at which a point source is formed, to a spherical lens 26.

Light propagating vertically to the optical axis is split into each unit wavelength range by the plurality of diffraction gratings 17, and a cylindrical lens 40 forms spectrum images on the input device 7 which is at the focal distance of the lens. Further, a cylindrical lens 41 is disposed between a spherical lens 27 and a diffraction grating 18 to form an image of the plurality of diffraction gratings 17 exactly on the diffraction grating 18. Light through diffraction grating 18 is focused by a spherical lens 22 and inputted to an optical fiber 6.

Light propagating horizontally to the optical axis is input to an optical fiber 6 by an optical system from the lens 21 to the lens 22 in substantially the same manner as the light propagating vertically to the optical axis. Thus, the input image to the core face of the optical fiber 6 is identical to the image of the point source which is formed by the a pinhole 51. According to the preferred embodiment of the present invention, light transmitted through the optical fiber 6 is taken out at the desired output point and goes through a slit 52 of 100μm width. A slit 52 acts as a point source of the optical system at the receiver, and therefore the quality of the transmitted image is improved.

The intensity of light transmitted through an optical fiber 6 is very low because the loss of light is large when a point source is formed at the transmitter and because the light is input to the small core of optical fiber after selecting the two-dimensional spectrum images within the wavelength range required for transmission by diffraction gratings. Thus, considering the loss of light, a light source having a small area of discharge and a large output is desirable for the present invention.

The spectrum of the input image is reproduced by using a spherical lens 23 and the plurality of diffraction gratings 19 in the optical system at the receiver according to the present invention, which is disposed similarly to the arrangement of the optical system at the transmitter, and input to image receiving means 8 by using a spherical lens 28 and a cylindrical lens 42. A known CCD camera may be used as image receiving means 8.

Figure 5A:
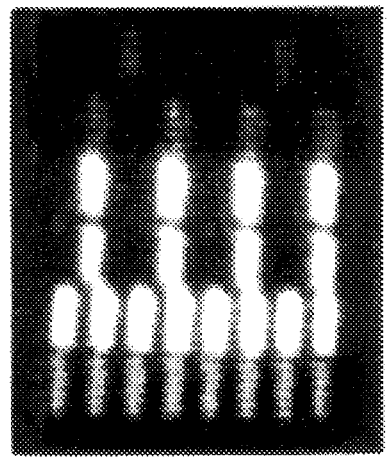
FIG. 5A to 5C illustrate examples of images transmitted by a system for direct image transmission according to a preferred embodiment of the present invention.
Figure 5B:
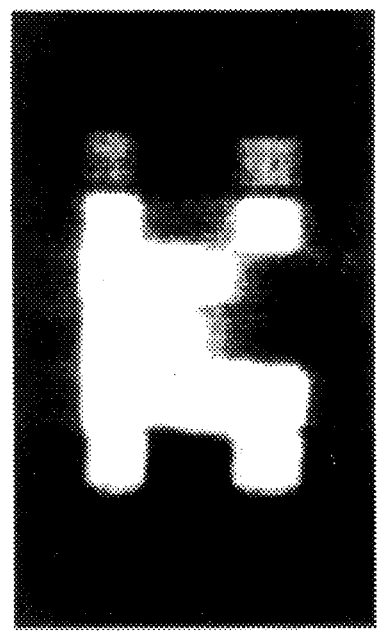
Figure 5C:
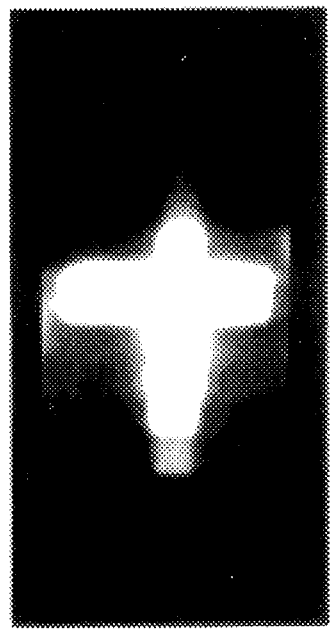

FIGS. 5A to 5C show examples of images transmitted by the direct image transmission system which is a preferred embodiment of the present invention as shown in FIGS. 3A and 3B. A transmitted image shown in FIG. 5A depicts a resolution chart of 0.8 mm line width, in FIG. 5B a mosaic of an English character "K," and in FIG. 5C a cross shape.

As described above, according to the present invention, direct transmission of two-dimensional images without an electrical driving unit for scanning or tuning can be achieved by disposing a single diffraction grating and a plurality of diffraction gratings. The plurality of diffraction gratings with different spacings are disposed parallel and adjacent one another in the stripe format on a single plane so that the directions of said single grating and said plurality of diffraction gratings are perpendicular to each other, thereby the light discharged from a point source is distributed spectrally, and each pixel on a two-dimensional image corresponds to the light of particular wavelength in one-to-one manner.

Further, while the present invention has been described with respect to an illustrative embodiment thereof, it will be sufficiently understood by those skilled in the art that various changes in detail may be made therein without departing from the spirit, scope, and teaching of the present invention referring the above detailed description. Therefore, the present invention disclosed herein is to be considered merely as illustrative and is limited only as specified in the following claims.

We claim:

1. A system for the direct transmission of image signals through a transmission medium comprising:

a transmitter comprising:
   a point source of white light,
   a first grating for diffracting light discharged from said point source to form a one-dimensional spectrum,
   a plurality of second diffraction gratings disposed so that they disperse light in a direction perpendicular to the dispersion direction of said first grating for continuously separating and distributing said one-dimensional spectrum formed by said first grating two-dimensionally for one-to-one correspondence to each pixel of a two-dimensional image wherein the spacings of each diffraction grating in said plurality of second diffraction gratings increase in a predetermined manner,
   an input device including image signals to be transmitted and permitting a selected portion of said diffracted light received from said plurality of second diffraction gratings to pass therethrough, and
   means for focusing the light received from said input device into said transmission medium; and
a receiver for receiving image signals transmitted from said transmitter through said transmission medium and reproducing the image that appears at the output of said input device from the received image signals.

2. A system for the direct transmission of image signals through a transmission medium comprising:

a transmitter comprising:
   a point source of white light,
   a first grating for diffracting light discharged from said point source to form a one-dimensional spectrum,
   a plurality of second diffraction gratings disposed so that they disperse light in a direction perpendicular to the dispersion direction of said first grating for continuously separating and distributing said one-dimensional spectrum formed by said first grating two-dimensionally for one-to-one correspondence to each pixel of a two-dimensional image wherein the spacings of each diffraction grating in said plurality of second diffraction gratings decrease in a predetermined manner,
   an input device including image signals to be transmitted and permitting a selected portion of said diffracted light received from said plurality of second diffraction gratings to pass therethrough, and
   means for focusing the light received from said input device into said transmission medium; and
a receiver for receiving image signals transmitted from said transmitter through said transmission medium and reproducing the image that appears at the output of said input device from the received image signals.

* * * * *